(12) United States Patent
Sekiya

(10) Patent No.: US 8,296,005 B2
(45) Date of Patent: Oct. 23, 2012

(54) MOBILE APPARATUS

(75) Inventor: Makoto Sekiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 585 days.

(21) Appl. No.: 12/565,264

(22) Filed: Sep. 23, 2009

(65) Prior Publication Data
US 2010/0082196 A1    Apr. 1, 2010

(30) Foreign Application Priority Data
Sep. 29, 2008    (JP) .................. 2008-250696

(51) Int. Cl.
*G01C 22/00*    (2006.01)
(52) U.S. Cl. .......... 701/26; 701/408; 701/469; 701/472; 701/485
(58) Field of Classification Search .............. 701/26, 701/408, 420, 469, 472, 485, 300
See application file for complete search history.

(56) References Cited

FOREIGN PATENT DOCUMENTS

| JP | 63-150710 | 6/1988 |
|----|-----------|--------|
| JP | 08-063229 | 3/1996 |
| JP | 09-185412 | 7/1997 |
| JP | 2000-202792 | 7/2000 |
| JP | 2006-035381 | 2/2006 |
| JP | 2008-066755 | 3/2008 |

*Primary Examiner* — Gertrude Arthur Jeanglaude
(74) *Attorney, Agent, or Firm* — Rankin, Hill & Clark LLP

(57) ABSTRACT

Even when a first moving condition is not satisfied, when it is determined that a second moving condition is satisfied and at the same time an object belongs to a first classification, an operation of a robot is controlled so as to prompt the object to move according to a first pattern or an arbitrary pattern. The second moving condition is a condition that the robot is capable of moving in according to a current target position trajectory without being obstructed by the object when the object is displaced according to the first pattern. The first classification is a classification of the object as an object capable of recognizing an action pattern of the robot and capable of moving autonomously.

10 Claims, 13 Drawing Sheets

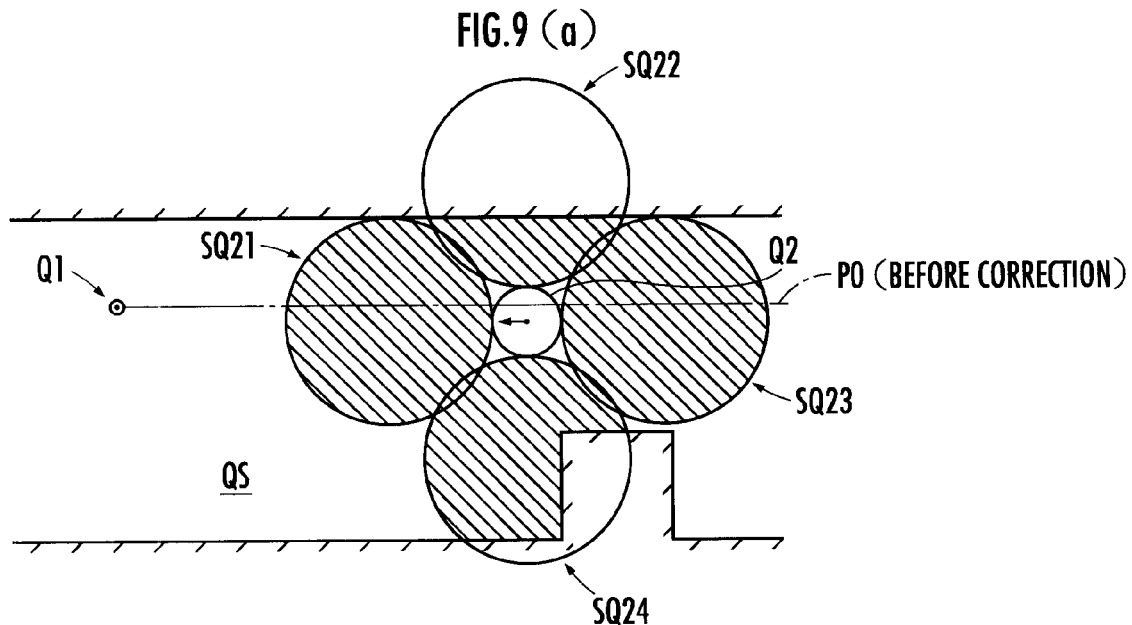
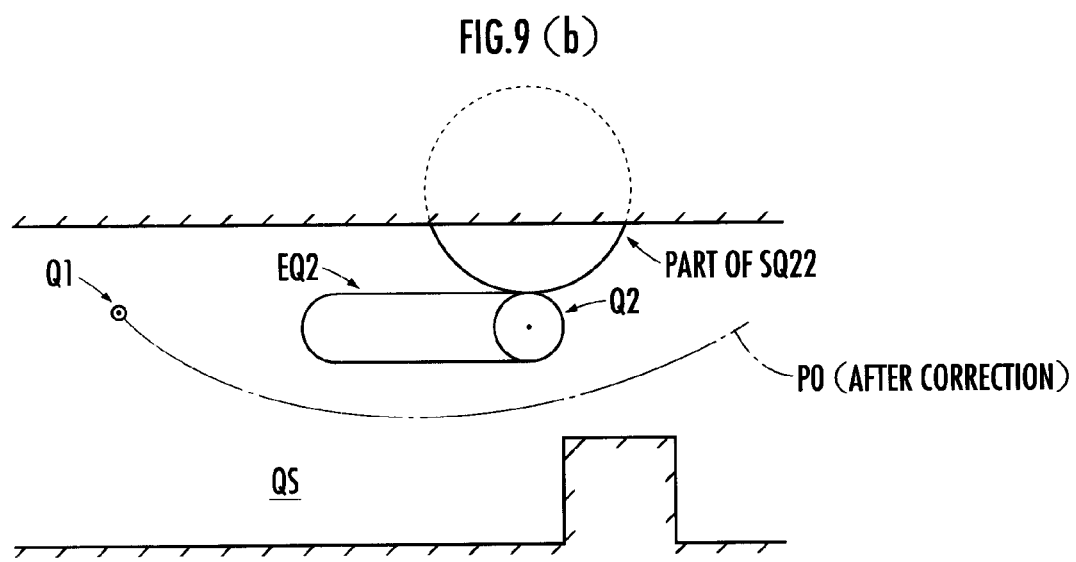

MOBILE APPARATUS

BACKGROUND OF THE INVENTION

1. Field of the Invention

The present invention relates to an apparatus which moves autonomously.

2. Description of the Related Art

When a mobile apparatus such as a robot changes the direction of movement in order to avoid coming into contact with a human, there is proposed a technique for avoiding occurrence of a deadlock state by the human changing the direction of movement also and the like (refer to Japanese Patent Laid-Open No. H09-185412). For example, a message for prompting the human existing at the front of the mobile apparatus to move, or a message indicating the direction of movement of the mobile apparatus, is generated by the mobile apparatus.

However, if it is not confirmed beforehand that the route of the robot could be secured by the displacement of the object according to the message generated by the robot, there is a possibility that the effort and time spent by the robot in emitting the message or the like is wasted. Further, there is a possibility that a message inappropriate from the viewpoint of the robot to move while avoiding contact with the object, such as emitting message for prompting the human as the object to move in a direction which is difficult for the object to move.

SUMMARY OF THE INVENTION

In view of such circumstances, an object of the present invention is to provide a mobile apparatus capable of moving or acting appropriately from the viewpoint of effectively avoiding the blocking of movement by an object.

In order to achieve the above object, the present invention provides a mobile apparatus equipped with a control device, which moves autonomously by the control device controlling the operation thereof according to a target position trajectory indicating a temporal changing pattern of the target position, the control device comprising: a first control processing element which is configured to determine whether or not the a first moving condition in which the mobile apparatus is capable of moving according to the current target position trajectory without being obstructed by an object, is satisfied, and when it is determined that the first moving condition is not satisfied, determine whether or not a second moving condition in which the mobile apparatus is capable of moving according to the current target position trajectory without being obstructed by the object by a displacement of the object according to a first pattern, is satisfied, and at the same time determine whether or not the object belongs to a first classification in which the object is capable of recognizing the action pattern of the mobile apparatus and is capable of moving autonomously; and a second control processing element which is configured to control the operation of the mobile apparatus so as to move according to the target position trajectory, when it is determined by the first control processing element that the first moving condition is satisfied, and control the operation of the mobile apparatus so as to prompt the object to move according to the first pattern or an arbitrary pattern, when it is determined by the first control processing element that the second moving condition is satisfied and at the same time that the object belongs to the first classification (a first aspect of the invention).

According to the mobile apparatus of the present invention, when it is determined that the first moving condition is satisfied, the operation of the mobile apparatus is controlled so as to move according to the target position trajectory. The phrase that the operation of the mobile apparatus is controlled means controlling the operation of equipments mounted on the mobile apparatus, such as an actuator or a sound output device.

The "first moving condition" is a condition that the mobile apparatus is capable of moving according to the current target position trajectory without being obstructed by the object.

Therefore, even though the object exists in the surrounding (more accurately, in an object detectable range) of the mobile apparatus, the mobile apparatus may move according to the current target position trajectory without being obstructed by the object.

On the other hand, even when the first moving condition is not satisfied, when it is determined that the second moving condition is satisfied and at the same time the object is determined as belonging to the first classification, the operation of the mobile apparatus is controlled so as to prompt the object to move according to the first pattern or an arbitrary pattern.

The "second moving condition" is a condition that the mobile apparatus is capable of moving according to the current target position trajectory without being obstructed by the object, when the object is displaced according to the first pattern. The "first classification" means the classification of the object which is capable of recognizing the action pattern of the mobile apparatus, and at the same time capable of moving autonomously.

Therefore, after confirming in advance that the mobile apparatus is capable of moving according to the current target position trajectory without being obstructed by the object, when the object is displaced autonomously according to the prompting operation of the mobile apparatus, the mobile apparatus makes operation so as to prompt the object to move.

Thereafter, it is continuously determined whether or not the first moving condition is satisfied, and according to need, whether or not the second moving condition is satisfied. By doing so, the mobile apparatus is capable of moving or acting appropriately from the viewpoint of effectively avoiding the movement of the mobile apparatus from being obstructed by the object.

In the mobile apparatus of the present invention, the first control processing element is configured to determine whether or not the second moving condition is satisfied after recognizing a predicted moving pattern of the object set on the basis of either one of or both of a motional state of the object and a size of a spatial allowance at a surrounding of the object as the first pattern (a second aspect of the invention).

According to the mobile apparatus of the above configuration, after confirming in advance that the mobile apparatus is capable of moving according to the current target position trajectory without being obstructed by the object, when the object is displaced autonomously according to the pattern predicted on the basis of the motional state of the object or the size of the spatial allowance at the surrounding of the object in accordance with the prompting operation of the mobile apparatus, the mobile apparatus operates so as to prompt the object to move. By doing so, the mobile apparatus is capable of moving or acting appropriately from the viewpoint of effectively avoiding the movement of the mobile apparatus from being obstructed by the object.

In the mobile apparatus of the present invention, the first control processing element is configured to determine, when determining that the second moving condition is not satisfied, whether or not a third moving condition in which the mobile apparatus is capable of moving according to a corrected target position trajectory without being obstructed by the object, by the displacement of the object according to a second pattern and the correction of the target position trajectory, is satisfied, and the second control processing element is configured to control the operation of the mobile apparatus so as to prompt the object to move according to the second pattern or an arbitrary pattern as well as to correct the target position trajectory, when it is determined by the first control processing element that the third moving condition is satisfied, and at the same time the object is determined as belonging to the first classification (a third aspect of the invention).

According to the mobile apparatus of the above configuration, even though the second moving condition is not satisfied, when it is determined that the third moving condition is satisfied and at the same time the object is determined as belonging to the first classification, the operation of the mobile apparatus is controlled so as to prompt the object to move according to the second pattern or an arbitrary pattern, and at the same time the target position trajectory is corrected.

The "third moving condition" is a condition that the mobile apparatus is capable of moving according to the corrected target position trajectory without being obstructed by the object, when the object is displaced according to the second pattern and at the same time the target position trajectory is corrected.

Therefore, after confirming in advance that the mobile apparatus is capable of moving according to the corrected target position trajectory without being obstructed by the object, when the object is displaced autonomously according to the prompting operation of the mobile apparatus, and at the same time correcting the target position trajectory, the mobile apparatus makes operation so as to prompt the object to move.

Thereafter, it is continuously determined whether or not the first moving condition is satisfied, and according to need, whether or not the second moving condition is satisfied and further whether or not the third moving condition is satisfied. By doing so, the mobile apparatus is capable of moving or acting appropriately from the viewpoint of effectively avoiding the movement of the mobile apparatus from being obstructed by the object.

In the mobile apparatus of the present invention, the first control processing element is configured to determine whether or not the third moving condition is satisfied after recognizing a predicted moving pattern of the object set on the basis of either one of or both of a motional state of the object and a size of a spatial allowance at a surrounding of the object as the second pattern (a fourth aspect of the invention).

According to the mobile apparatus of the above configuration, after confirming in advance that the mobile apparatus is capable of moving according to the corrected target position trajectory without being obstructed by the object, when the object is displaced according to the pattern predicted on the basis of the motional state of the object or on the size of the spatial allowance at the surrounding of the object in accordance with the prompting operation of the mobile apparatus, and the target position trajectory is corrected, the mobile apparatus operates so as to prompt the object to move. By doing so, the mobile apparatus is capable of moving or acting appropriately from the viewpoint of effectively avoiding the movement of the mobile apparatus from being obstructed by the object.

In the mobile apparatus of the present invention, the first control processing element is configured to determine, when determining that the first moving condition is not satisfied, whether or not a fourth moving condition in which the mobile apparatus is capable of moving according to the corrected target position trajectory without being obstructed by the object by the correction of the target position trajectory, is satisfied, and the second control processing element is configured to correct the target position trajectory, when it is determined by the first control processing element that the fourth moving condition is satisfied (a fifth aspect of the invention).

According to the mobile apparatus of the above configuration, even when the first moving condition is not satisfied, when it is determined that the fourth moving condition is satisfied, the target position trajectory is corrected, and the operation of the mobile apparatus is controlled so as to move according to the corrected target position trajectory.

The "fourth moving condition" is a condition that the mobile apparatus is capable of moving according to the corrected target position trajectory without being obstructed by the object, when the current target position trajectory is corrected.

Therefore, even though the object exists in the surrounding of the mobile apparatus, after confirming in advance that the mobile apparatus is capable of moving according to the corrected target position trajectory without being obstructed by the object, the target position trajectory is corrected. By doing so, the mobile apparatus is capable of moving or acting appropriately from the viewpoint of effectively avoiding the movement of the mobile apparatus from being obstructed by the object.

In the mobile apparatus according to the present invention, the first control processing element is configured to determine, when determining that the object does not belong to the first classification, whether or not the object belongs to a second classification in which the object is movable by acting of a force from the mobile apparatus, and the second control processing element is configured to control the operation of the mobile apparatus so as to move the object according to the first pattern, and so as to return to the current target position trajectory according to need, when it is determined by the first control processing element that the second moving condition is satisfied, and at the same time the object belongs to the second classification (a sixth aspect of the invention).

According to the mobile apparatus of the above configuration, even though the first moving condition is not satisfied, when it is determined that the second moving condition is satisfied, and at the same time the object is determined as belonging to the second classification, the operation of the mobile apparatus is controlled so as to move the object according to the first pattern.

The "second classification" means the classification of the object which is capable of being moved according to the acting of the force from the mobile apparatus.

Therefore, after confirming in advance that the mobile apparatus is capable of moving according to the current target position trajectory without being obstructed by the object when the object is displacing forcibly according to the operation of the mobile apparatus, the mobile apparatus is operated so as to move the object. By doing so, the mobile apparatus is capable of moving or acting appropriately from the viewpoint of effectively avoiding the movement of the mobile apparatus from being obstructed by the object.

In the mobile apparatus of the present invention, the first control processing element is configured to determine, when determining that the second moving condition is not satisfied, whether or not the third moving condition in which the mobile apparatus is capable of moving according to the corrected target position trajectory without being obstructed by the object, by the displacement of the object according to the second pattern and the correction of the target position trajectory, is satisfied, and the second control processing element is configured to control the operation of the mobile apparatus so as to move the object according to the second pattern, and so as to return to the current target position trajectory according to need, when it is determined by the first control processing element that the third moving condition is satisfied, and at the same time the object belongs to toe second classification (a seventh aspect of the invention).

According to the mobile apparatus of the above configuration, even though the second moving condition is not satisfied, when it is determined that the third moving condition is satisfied, and at the same time determined that the object belongs to the second classification, the operation of the mobile apparatus is controlled so as to move the object according to the second pattern or an arbitrary pattern, and the target position trajectory is corrected.

Therefore, after confirming in advance that the mobile apparatus is capable of moving according to the corrected target position trajectory without being obstructed by the object, when the object is moved according to the operation of the mobile apparatus and the target position trajectory is corrected, the mobile apparatus is operated so as to move the object. By doing so, the mobile apparatus is capable of moving or acting appropriately from the viewpoint of effectively avoiding the movement of the mobile apparatus from being obstructed by the object.

In the mobile apparatus of the present invention, the first control processing element is configured to determine whether or not the mobile apparatus is capable of moving according to the target position trajectory without being obstructed by an object, according to whether or not an interval between the object and the boundary of the movable region sandwiching the target position trajectory is equal to or more than a safety interval (an eighth aspect of the invention).

According to the mobile apparatus of the above configuration, it is determined whether or not the mobile apparatus is capable of moving according to the target position trajectory without being obstructed by the object, according to the size of the interval between the object and the boundary of the movable region sandwiching the target position trajectory. By doing so, the mobile apparatus is capable of moving or acting appropriately, from the viewpoint of avoiding effectively with room for allowance straying out from the movable region and being obstructed by the object.

BRIEF DESCRIPTION OF THE DRAWINGS

FIG. 9 is an explanatory view concerning a method of correcting a target position trajectory of the robot;

DETAILED DESCRIPTION OF THE PREFERRED EMBODIMENTS

An embodiment of a mobile apparatus according to the present invention will be now described in further detail with reference to the accompanying drawings.

Figure 1:
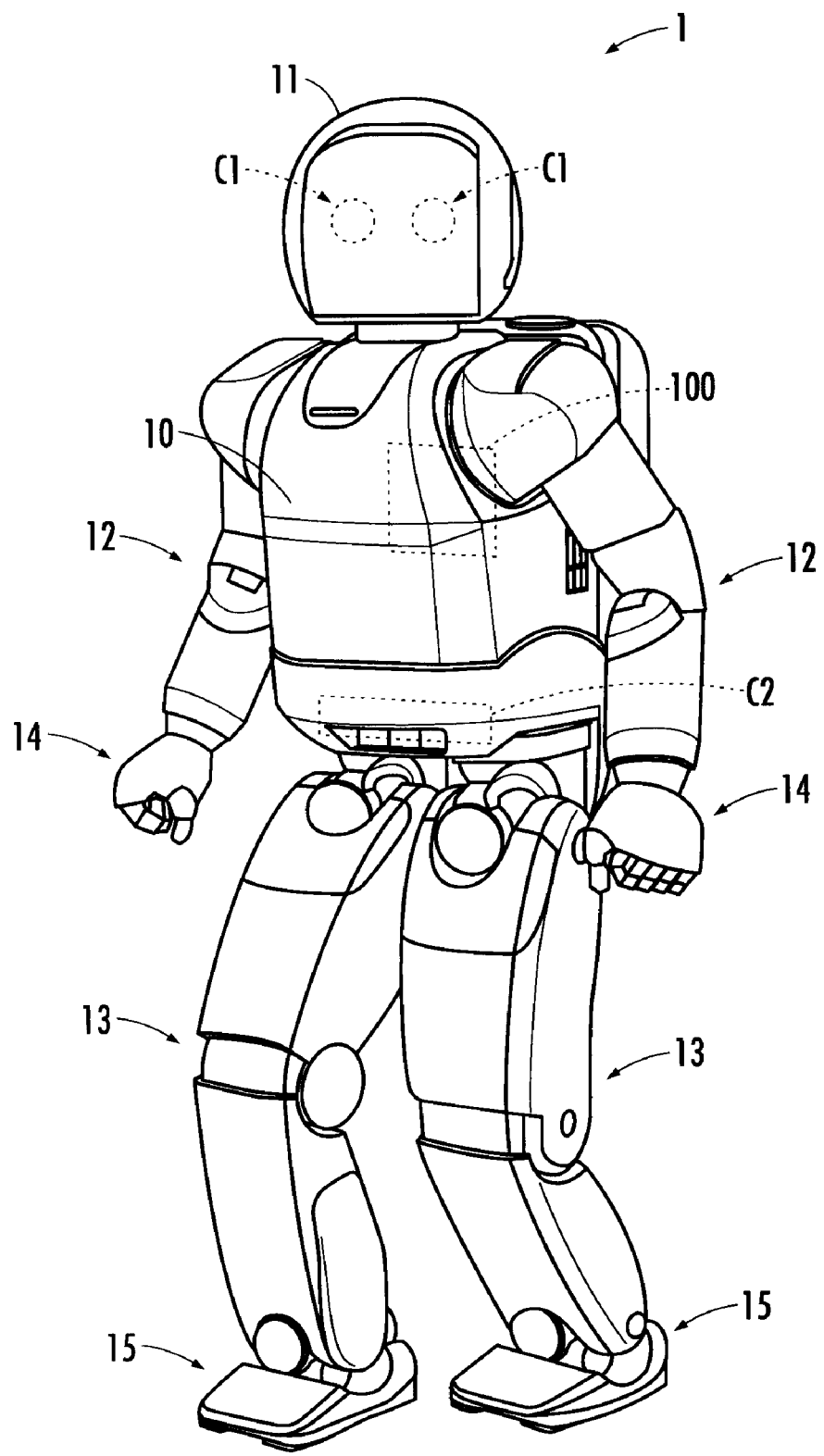
FIG. 1 is an explanatory view of the configuration of a robot as an embodiment of a mobile apparatus of the present invention.

First, an explanation will be given on the configuration of the mobile apparatus. A legged mobile robot 1 as the mobile apparatus shown in FIG. 1 is provided with a body 10, a head 11 mounted on the top of the body 10, right and left arms 12 extended from the right and left sides of an upper portion of the body 10, hands 14 provided at the distal ends of the arms 12, right and left legs 13 extended downward from the bottom of the body 10, and feet 15 attached to the distal ends of the legs 13.

Figure 2:
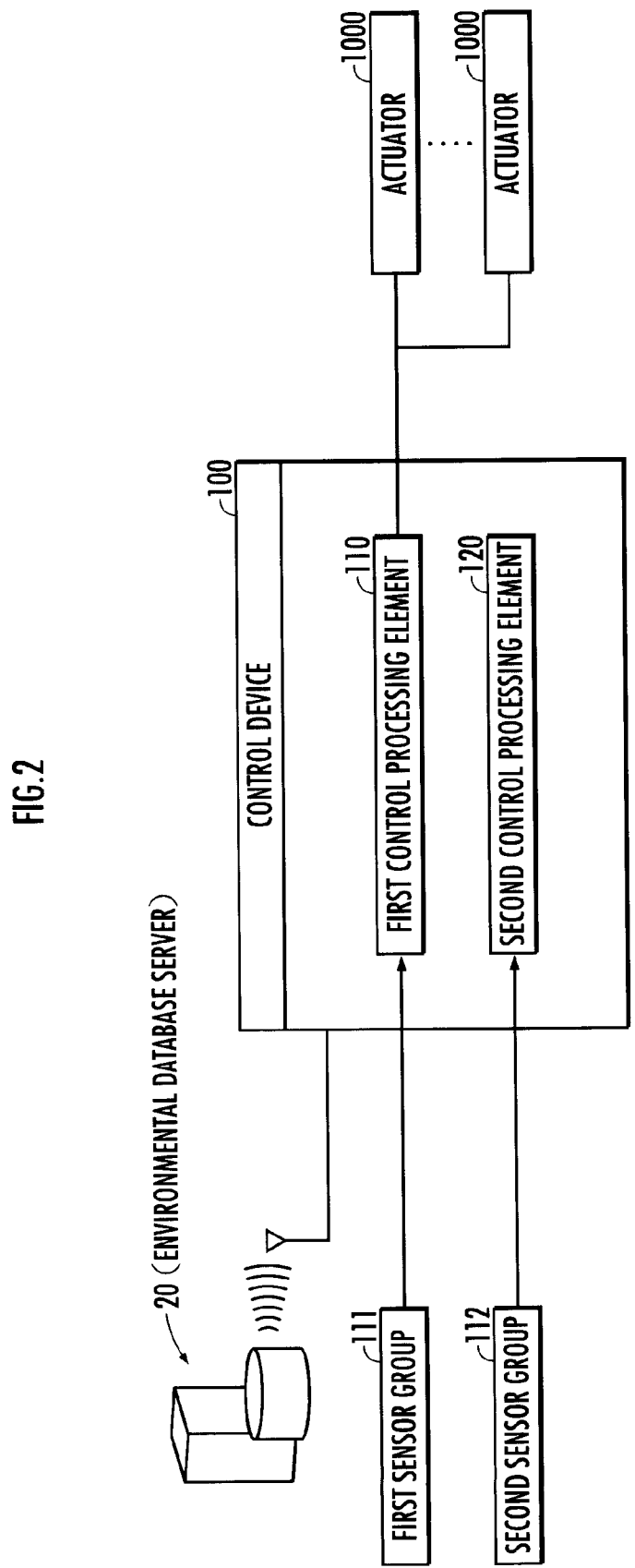
FIG. 2 is an explanatory view of the configuration of a control device of the robot.

As disclosed in Published Japanese Translation of PCT Application 03-090978 or Published Japanese Translation of PCT Application 03-090979, the robot 1 is capable of bending and stretching the arms 12 and the legs 13 at a plurality of joints corresponding to those of a human being, such as shoulder joints, elbow joints, carpal joints, hip joints, knee joints, and foot joints, by using forces transmitted from an actuator 1000 (refer to FIG. 2).

The robot 1 is capable of moving autonomously by repeating the operation of leaving and landing each of the right and left legs 13 (or the feet 15) from and onto a floor.

The height of the head 11 may be adjusted by adjusting the angle of inclination of the body 10 with respect to the vertical direction thereof. The head 11 is mounted with a pair of head cameras (CCD cameras) $C_1$ arranged side by side and facing forward of the robot 1. The body 10 is mounted at the lower front side with a waist camera (an infrared camera) $C_2$. Here, the mobile apparatus may be the robot 1 moving autonomously by operating a plurality of the legs 13, and may be any other apparatus having mobile function, such as a wheel-type mobile robot (automobile) or the like.

The robot 1 is equipped with a control device 100 configured by an ECU or a computer (configured by a CPU, a ROM, a RAM, an I/O and the like) as a hardware. A "control program" of the present invention is stored in a memory of the computer. The control program may be installed to the computer through software recording medium such as a CD or DVD, but may be downloaded to the computer from a server via a network or a satellite upon transmission of a request signal from the robot 1 to the server.

The control device 100 shown in FIG. 2 controls the operation of the arms 12 and the legs 13, by controlling the operation of the actuator 1000 on the basis of the output signals from a first sensor group 111 and a second sensor group 112 and the like.

The first sensor group 111 is a group of sensors for measuring the behavioral state of the robot 1. The various sensors mounted on the robot 1, such as a gyro sensor outputting signals corresponding to the acceleration of the body 10, a rotary encoder outputting signals corresponding to the joint angle of each joint, a force sensor outputting signals corresponding to the floor reaction force acting on the legs 13, and the like, corresponds to the first sensor group 111.

The second sensor group 112 is a group of sensors for measuring the circumstances of the robot 1, such as the behavioral state of an object. The head camera $C_1$, the waist camera $C_2$ and the like corresponds to the second sensor group 112. The actuator 1000 is configured from a driving source such as an electric motor and the like, and as well from a reducer provided between an output shaft of the driving source and a link constituting the arms 12 and the legs 13, and a flexible element such as an elastic member and the like.

The control device 100 is equipped with a first control processing element 110 and a second control processing element 120. The first control processing element 110 determines a satisfaction of a moving condition to be discussed later, and a classification of the object 2. The second control processing element 120 controls the operation of the robot 1 on the basis of the determination result of the first control processing element 110.

The "recognition" of information by a constituent element in the present invention means to carry out any information processing required to prepare information for further information processing. Such information processing includes, for example, the retrieval of information from a database, reading information from a storage device, such as a memory, measuring, calculating, estimating or judging information on the basis of output signals of sensors and the like, and storing information obtained by measurement or the like in a memory by the constituent element.

Explanation will be given on the function of the robot with the above-described configuration.

Figure 3:
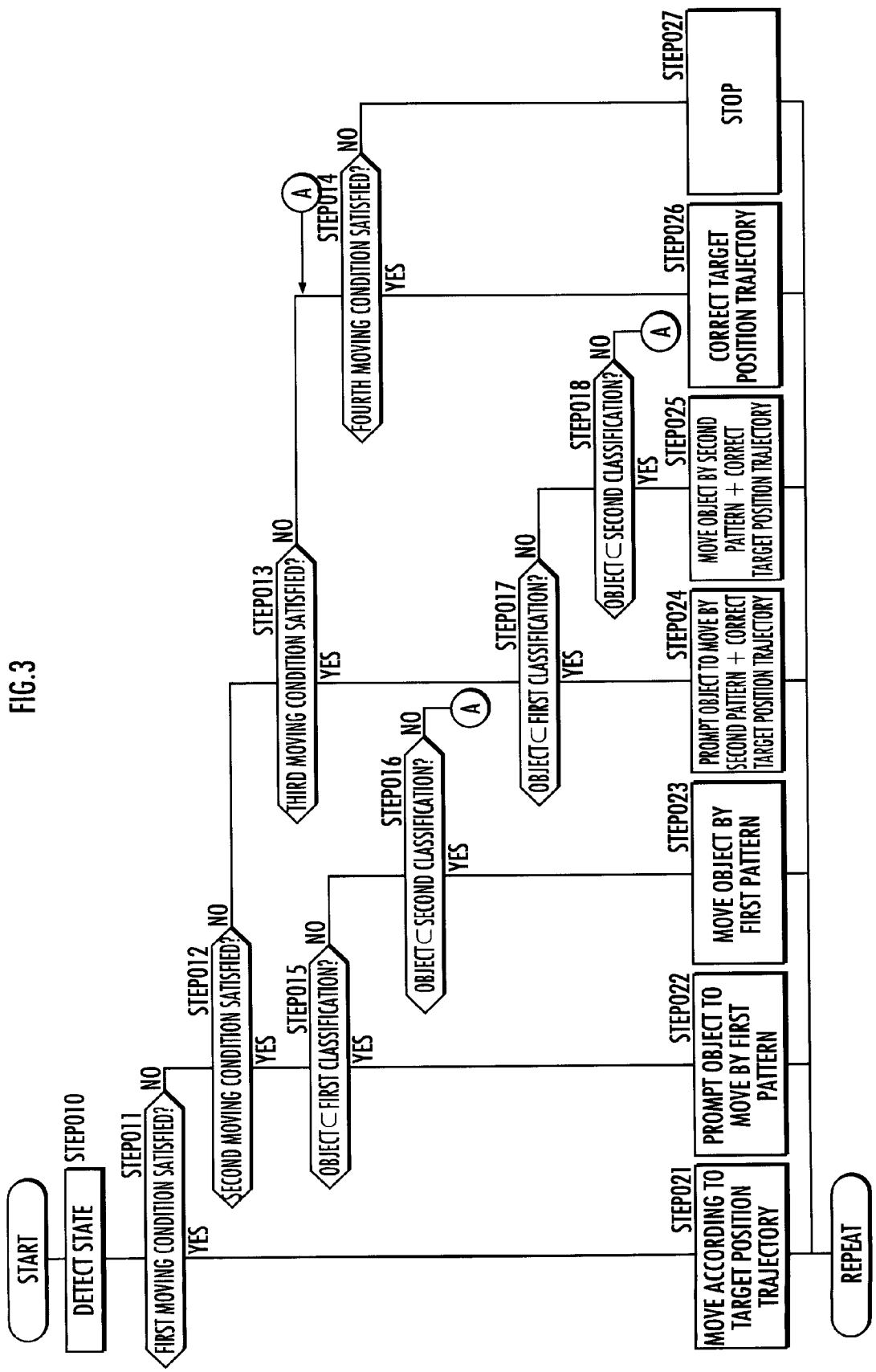
FIG. 3 is a flow chart showing the control method of the operation of the robot.

First, the first control processing element 110 detects the state (FIG. 3/STEP010). More specifically, a movable region QS defined in a two-dimensional or three-dimensional space of the robot 1, is retrieved from an environmental database server 20, or is read out from a memory or a storage device.

By doing so, the movable region QS defined as shown in FIGS. 6(a) and (b), which corresponds to the shapes such as a wail of a passage or a fixed object is recognized. As will be discussed later, when a first spatial element $Q_1$ or a second spatial element $Q_2$ is recognized as a Minkowski sum of a first region $q_1$ and a second region $q_2$ having sizes corresponding to the robot 1 and the object 2, respectively, the movable region QS is recognized as a Minkowski difference between a region having a size corresponding to a size of the movable region and the first region $q_1$ or the second region $q_2$.

Here, the "spatial element" means a "point" which could define the states such as a position, velocity and acceleration in a model space, a "line segment" which could define the states such as a shape and length in the model space in addition to the position or the like, and a "region" which could define the states such as the shape and area in the model space in addition to the position or the like.

The movable region QS may be defined as a planar surface or a curved surface which could define an arbitral point by latitude and longitude, but may be changed on the basis of the shape such as an inclination angle of the floor surface, and an existence or nonexistence of an unevenness or an irregularity in the surroundings of the robot 1, which is recognized on the basis of the image obtained through the head camera $C_1$.

Further, on the basis of the output signals from the first sensor group 111 and the like, each of the robot 1 and a position trajectory indicating the changing pattern of the position thereof are recognized as the first spatial element $Q_1$ and a first position trajectory indicating the changing pattern of the first position $P_1$ in the movable region QS, respectively.

Figure 4:
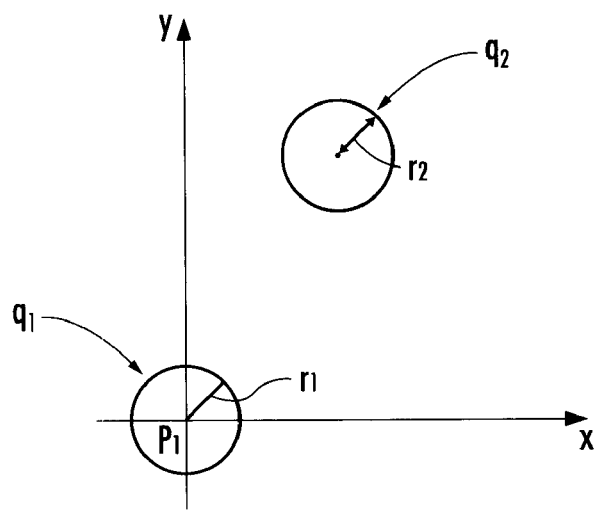
FIG. 4 is an explanatory view concerning a recognition method of a first spatial element and a second spatial element.
Figure 4:
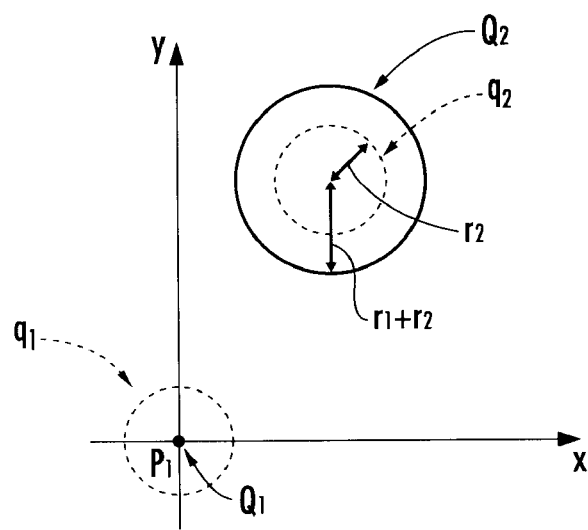

The shape and size of the first spatial element $Q_1$ are read out from the memory or the database. The first region $q_1$ having the size corresponding to the size of the robot 1, as shown in FIG. 4(a), may be recognized as it is as the first spatial element $Q_1$. However, in the present embodiment, the first region $q_1$ reduced to a dot shape, as is shown in FIG. 4(b), is recognized as the first spatial element $Q_1$.

By doing so, it is possible to reduce the amount of arithmetic processing necessary for the search on the trajectory to which the robot 1 must follow. Here, when an object such as a box or an equipment is moving integrally with the robot 1, such as when the robot 1 is holding the box in the arms 12, or when the optional equipment for adding functions to the robot 1 is mounted on the body 10, the shape and size of the robot 1 and the object which is moving integrally with the robot 1 may be recognized as the shape and size of the robot 1.

The position of the robot 1 is measured on the basis of signals representing latitude and longitude (or coordinates in a fixed coordinate system) obtained from a GPS function, signals representing an acceleration of the robot 1 sequentially output from a gyro sensor, or signals representing the angle of each joints such as the legs 13 output from a rotary encoder, and by using an inverse dynamics model according to need. On the basis of the changing pattern or a temporal differentiation of the first position $P_1$, a velocity (a first velocity) $v_1$ of the first spatial element $Q_1$, and an acceleration (a first acceleration) $\alpha_1$ thereof when necessary, may be calculated.

Further, on the basis of the output signals from the second sensor group 112 and the like, each of the object 2 and a trajectory representing the changing pattern of the position thereof are recognized as the second spatial element $Q_2$ and a second position trajectory representing the changing pattern of a second position $P_2$ in the movable region QS, respectively.

After specifying the type of the object 2 on the basis of the acquired image of the object 2 by the head camera $C_1$, the shape and size of the second spatial element $Q_2$ may be recognized by searching the memory (to which a table showing the correspondence between the type, shape and size of the object is stored) on the basis of the result of specification. The second region $q_2$ having a size corresponding to the size of the object 2, as shown in FIG. 4(a), may be recognized as it is as the second spatial element $Q_2$. However, in the present embodiment, as is shown in FIG. 4(b), a Minkowski sum of the first region $q_1$ and the second region $q_2$ is recognized as the second spatial element $Q_2$.

The position of the object 2 may be measured on the basis of the image of the object 2 acquired by the head camera $C_1$ and the waist camera $C_2$. On the basis of the changing pattern or a temporal differentiation of the second position $P_2$, a velocity (a second velocity) $v_2$ of the second spatial element $Q_2$, and an acceleration (a second acceleration) $\alpha_2$ thereof when necessary, may be calculated.

Further, the first spatial element $Q_1$ which is expanded sequentially or intermittently in accordance with the changing pattern of the first position $P_1$ is recognized as a first expanded spatial element $EQ_1$. Further, the second spatial element $Q_2$ which is expanded sequentially or intermittently in accordance with the changing pattern of the second position $P_2$ is recognized as a second expanded spatial element $EQ_2$.

Figure 5:
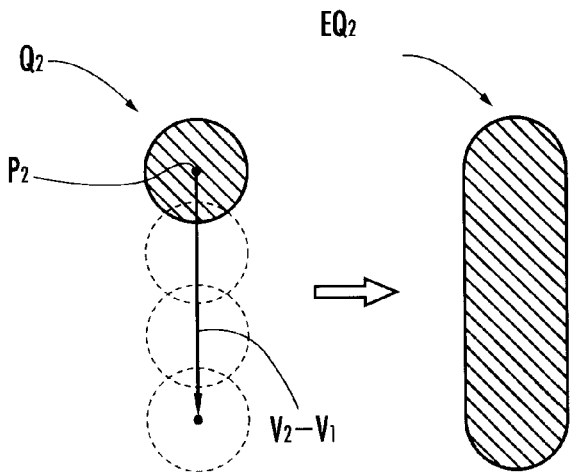
FIG. 5 is an explanatory view concerning a recognition method of a second expanded spatial element.
Figure 5:
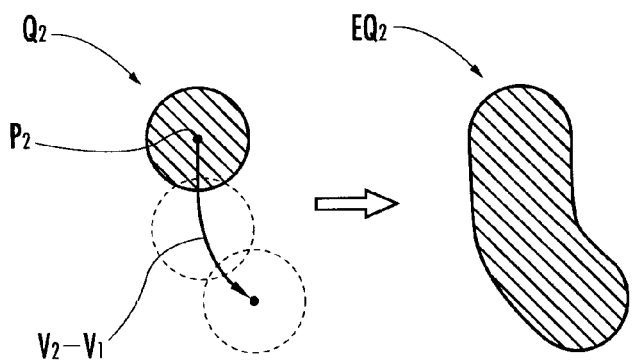
Figure 5:
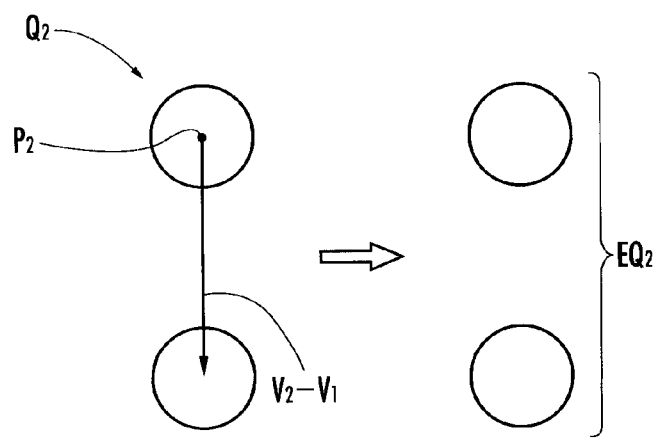

The second spatial element $Q_2$ which is sequentially expanded in the direction of a second velocity vector $v_2$, for example, is recognized as the second expanded spatial element $EQ_2$ having a straight strip-shape as shown in the right side of FIG. 5(a). A variable k which represents the degree of expanding of the second spatial element $Q_2$ is expressed according to a relational expression (1), on the basis of a first position vector $P_1$, a second position vector $P_2$, the first velocity vector $v_1$, and the second velocity vector $v_2$.

$$k=|P_2-P_1||v_2|/|v_2-v_1| \quad (1)$$

Further, the second spatial element $Q_2$ which is sequentially expanded in a whirl according to the second velocity vector $v_2$ (or a second acceleration vector $\alpha_2$) is recognized as the second expanded spatial element $EQ_2$ having a bent strip-shape as shown in the right side of FIG. 5(b).

Here, the second spatial element $Q_2$ which is intermittently expanded in the direction according to the second velocity vector $v_2$ may be recognized as the second expanded spatial element $EQ_2$ comprised of a plurality of the spatial elements as shown in the right side of FIG. 5(c).

The first expanded spatial element $EQ_1$ is recognized similarly to the second expanded spatial element $EQ_2$, but in this occasion, contrary to the case where the second expanded spatial element $EQ_2$ is recognized, the Minkowski sum of the first region $q_1$ and the second region $q_2$ is recognized as the first spatial element $Q_1$, and the second region $q_2$ reduced to a dot shape is recognized as the second spatial element $Q_2$. Each of the first expanded spatial element $EQ_1$ and the second expanded spatial element $EQ_2$ are used in retrieving a target position trajectory or the like to be discussed later, so that it is sufficient to recognize the same according to need and not steadily.

The first control processing element 110 determines whether or not a "first moving condition" is satisfied on the basis of the result of state detection (FIG. 3/STEP011).

The "first moving condition" is a condition in which the robot 1 is capable of moving according to a current target position trajectory $P_0$ without being obstructed by the object 2. Specifically, the fact that the current target position trajectory $P_0$ of the first spatial element $Q_1$ does not cross or come into contact with the second spatial element $Q_2$ defined in the movable region QS, is set as the first moving condition.

For example, in the case as shown in FIGS. 6(a) and (b), the target position trajectory $P_0$ of the first spatial element $Q_1$ crosses the second spatial element $Q_2$, therefore it is determined that the first moving condition is not satisfied.

Here, instead of or in addition to "the fact that the target position trajectory $P_0$ of the first spatial element $Q_1$ does not cross the second spatial element $Q_2$", "the fact that an interval between the first spatial element $Q_1$ and the second spatial element $Q_2$ is equal to or more than a predetermined interval", or "the fact that the robot 1 does not receive or recognize a signal or a sign emitted by the object judging that there is high possibility of coming into contact with the robot 1" may be adopted as the first moving condition.

When the first control processing element 110 determines that the first moving condition is satisfied (FIG. 3/STEP011: YES), then the second control processing element 120 controls the operation of the legs 13 and the like of the robot 1 so that the robot 1 moves according to the current target position trajectory $P_0$ (FIG. 3/STEP021).

Whether or not the robot 1 is capable of moving according to the current target position trajectory $P_0$ without being obstructed by the object 2 may be determined by whether or not first through fourth auxiliary conditions to be explained next are all satisfied, instead of or in addition to the first moving condition. Here, it may be determined that the robot 1 is capable of moving according to the current target position trajectory $P_0$, when only a part of the first through fourth auxiliary conditions is satisfied.

The first auxiliary condition is a condition that "the target position trajectory $P_0$ does not cross or does not come into contact with the second expanded spatial element $EQ_2$".

Figure 7:
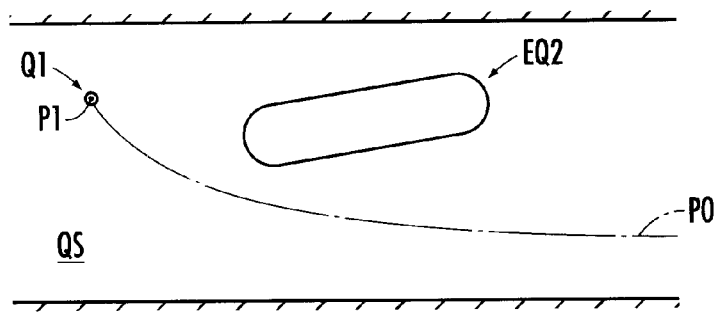
FIG. 7 is an explanatory view concerning a method of confirming safety.
Figure 7:
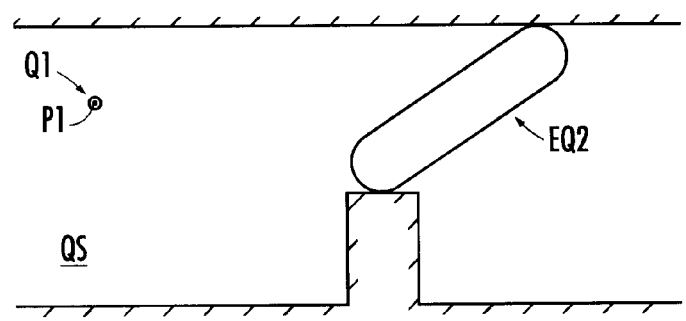
Figure 7:
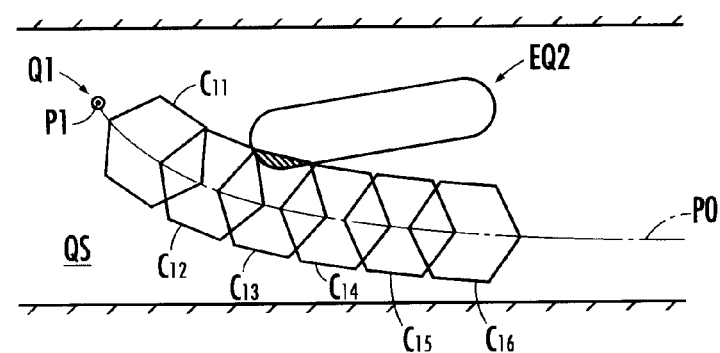
Figure 7:
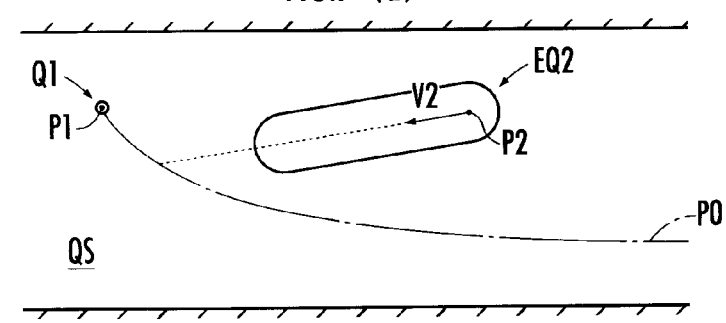

For example, as is shown in FIG. 7(a), when the target position trajectory $P_0$ does not cross or come into contact with the second expanded spatial element $EQ_2$, it is determined that the first auxiliary condition is satisfied. On the other hand, as is shown in FIG. 7(b), when the second expanded spatial element $EQ_2$ is blocking the movable region QS ahead of the first spatial element $Q_1$, the target position trajectory $P_0$ which does not cross or come into contact with the second expanded spatial element $EQ_2$ does not exist. In the case where the target position trajectory $P_0$ which does not cross or come into contact with the second expanded spatial element $EQ_2$ does not exist, the target position trajectory $P_0$ cannot be retrieved, so that it is determined that the first auxiliary condition is not satisfied.

The second auxiliary condition is a condition that "an interval (a first interval) between the target position trajectory $P_0$ and the second expanded spatial element $EQ_2$ is larger than a first safety interval".

For example, as shown in FIG. 7(c), the overlapping area between each of a plurality of first cells $C_{1i}$ (i=1, 2, . . . ) of a regular hexagonal shape and having a center (a reference point) thereof on the target position trajectory $P_0$ and the movable region QS excluding the portion (shaded portion) overlapping with the second expanded spatial element $EQ_2$, is evaluated as the first interval. This area is measured, for example, according to a Monte Carlo method. That is, dots are arranged randomly in the movable region QS, the number of dots included in the overlapping region between the first cells $C_{1i}$ and the movable region QS excluding the portion overlapping with the second expanded spatial element $EQ_2$ is counted, and this number count is measured as the overlapping area.

Here, the shape of the first cells $C_{1i}$ shown in FIG. 7(c) may take various shapes such as a circular shape and a rod-shape, the number thereof may be an arbitrary number, and it may not overlap each other. Further, the first interval may be evaluated geometrically, such as a shortest distance between a foot of a perpendicular of the target position trajectory $P_0$ and a point of intersection between the foot and the second expanded spatial element $EQ_2$.

Here, instead of or in addition to "the first interval is larger than the first safety interval", the second auxiliary condition may be "an extended line in the direction of the second velocity vector $v_2$ having the second position $P_{12}$ as origin does not cross the target position trajectory $P_0$".

For example, as is shown in FIG. 7(d), when the extended line crosses the target position trajectory $P_0$, it is determined that the second auxiliary condition is not satisfied.

The third auxiliary condition is a condition that it is possible to retrieve a predicted position trajectory RP in which the second spatial element $Q_2$ is capable of avoiding contact with the first expanded spatial element $EQ_1$ in the movable region QS.

For example, as shown in FIG. 8(a), when the predicted position trajectory RP that does not cross or come into contact with the first expanded spatial element $EQ_1$ is retrieved, it is determined that the third auxiliary condition is satisfied. Heretofore known methods such as an RRT connection method is used in retrieving the predicted position trajectory RP.

The fourth auxiliary condition is a condition that "an interval (a second interval) between the predicted position trajectory RP of the second spatial element $Q_2$ and the first expanded spatial element $EQ_1$ is larger than a second safety interval".

For example, as is shown in FIG. 8(b), the overlapping area between each of a plurality of second cells $C_{2i}$ (i=1, 2, . . . ) of a regular hexagonal shape and having a center (a reference point) thereof on the predicted position trajectory RP and the movable region QS excluding the portion (shaded portion) overlapping with the first expanded spatial element $EQ_1$, is evaluated as the second interval by the second control processing element 120 according to the Monte Carlo method or the like.

Figure 8:
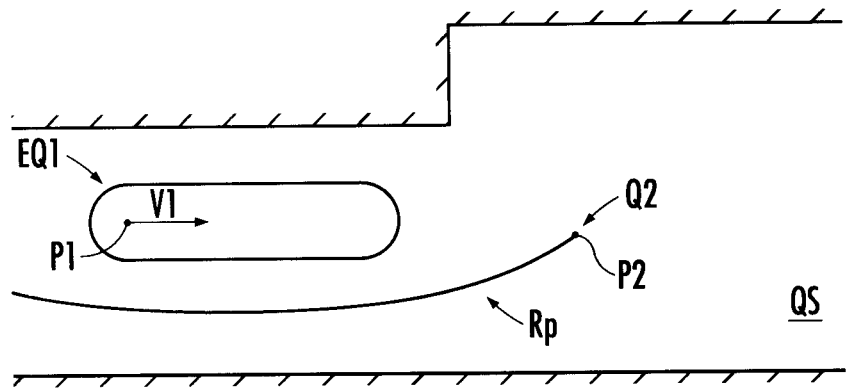
FIG. 8 is an explanatory view concerning the method of confirming safety.
Figure 8:
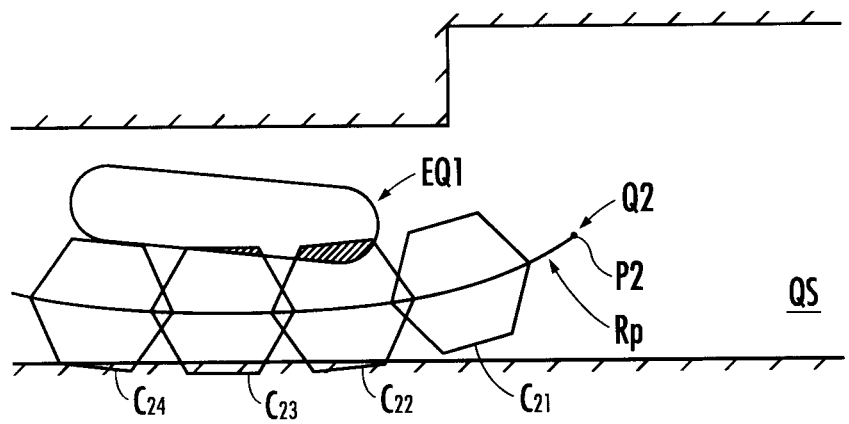
Figure 8:
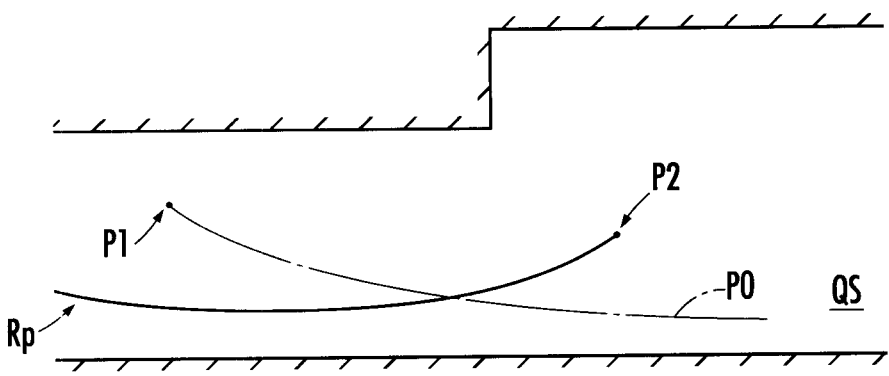

Here, the shape of the second cells $C_{2i}$ shown in FIG. 8(*b*) may take various shapes such as a circular shape and a rod-shape, the number thereof may be an arbitrary number, and it may not overlap each other. Further, the second interval may be evaluated geometrically, such as a shortest distance between a foot of a perpendicular of the predicted position trajectory RP and a point of intersection between the foot and the first expanded spatial element $EQ_1$.

Here, instead of or in addition to "the second interval is larger than the second safety interval", the fourth auxiliary condition may be "the target position trajectory $P_0$ of the first spatial element $Q_1$ does not cross with the predicted position trajectory RP of the second spatial element $Q_2$". For example, as shown in FIG. 8(*c*), when the target position trajectory $P_0$ cross the predicted position trajectory RP, it is determined that the fourth auxiliary condition is not satisfied.

On the other hand, when it is determined that the first moving condition is not satisfied (FIG. 3/STEP011: NO), the first control processing element 110 further determines whether or not a "second moving condition" is satisfied on the basis of the result of state detection (FIG. 3/STEP012).

The "second moving condition" is a condition that the robot 1 is capable of moving according to the current target position trajectory $P_0$ without being obstructed by the object 2, when the object 2 is displaced according to a first pattern. Specifically, the fact that the current target position trajectory $P_0$ of the first spatial element $Q_1$ defined in the movable region QS does not cross or come into contact with the second spatial element $Q_2$, by the displacement of the second spatial element $Q_2$ from a current second position $P_2$ in the movable region QS, is set as the second moving condition.

Figure 6:
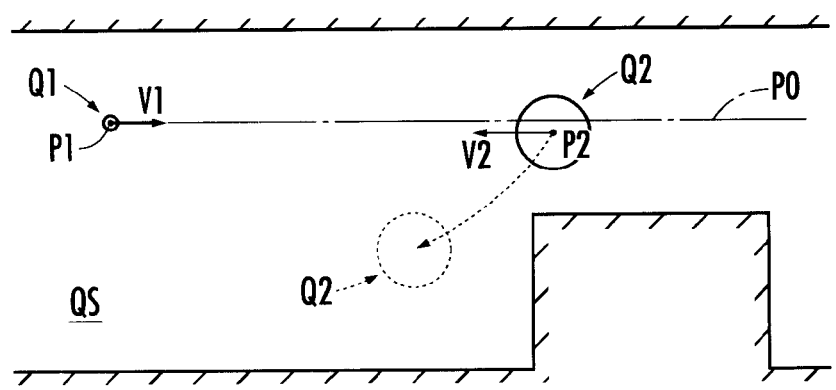
FIG. 6 is an explanatory view concerning a method of determining satisfaction of a first moving condition and a second moving condition.
Figure 6:
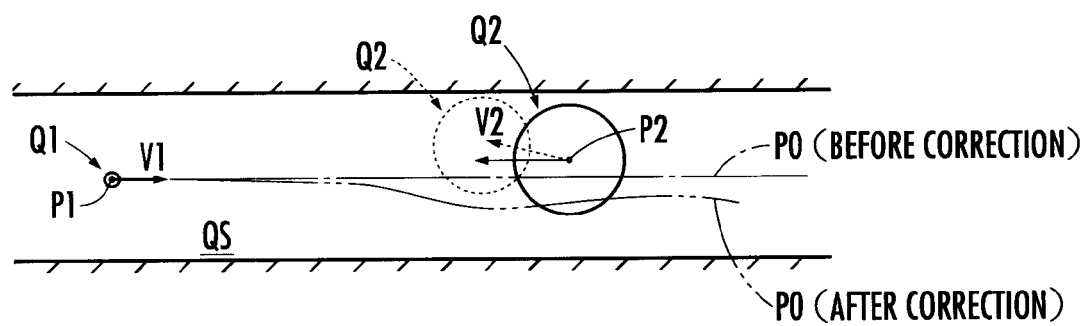

For example, in the state shown in FIG. 6(*a*), when the second spatial element $Q_2$ is displaced as is shown by a broken arrow, the target position trajectory $P_0$ shown by a dashed-dotted line does not cross or come into contact with the second spatial element $Q_2$, so that it is determined that the second moving condition is satisfied.

Here, a predicted moving pattern of the object 2, which is set on the basis of either one of or both of a motional state of the object 2 (specified by a time changing pattern of the second position $P_2$, the second velocity vector $v_2$ and the like) and a size of a spatial allowance in the vicinity of the object 2 (interval between another object or the boundary of the movable region), or in addition thereto a motional state of the robot 1 (specified by a time changing pattern of the first position $P_1$, the first velocity vector $v_1$ and the like), may be recognized as the "first pattern".

When it is determined that the second moving condition is satisfied (FIG. 3/STEP012: YES), the first control processing element 110 determines whether or not the object 2 belongs to a first classification (FIG. 3/STEP015).

The "first classification" represents an object class such as a human or a robot which is capable of recognizing an action pattern of the robot 1, and at the same time capable of moving autonomously.

When it is determined that the object 2 does not belong to the first classification (FIG. 3/STEP015: NO), then it is determined whether or not the object 2 belongs to a second classification (FIG. 3/STEP016).

The "second classification" represents the object class such as a carriage, a flower pot, a box and the like, that are moved by the acting of the force from the robot 1.

Specifically, on the basis of the image of the object 2 acquired by the head camera $C_1$, the object class of the object 2 is determined according to methods such as a shape pattern matching using a template stored in the memory of the control device 100. Here, the object class of the object 2 may be determined according to other methods, such as retrieving the classification of the object 2 existing in the second position $P_2$ from the environmental database server 20, or gently pushing the object 2 by the robot 1. Moreover, the classification of the object 2 may be determined before determining the satisfaction of the second moving condition.

When it is determined by the first control processing element 110 that the second moving condition is satisfied (FIG. 3/STEP012: YES), and at the same time it is determined that the object 2 belongs to the first classification (FIG. 3/STEP015: YES), the operation of the robot 1 is controlled by the second control processing element 120 so that the robot 1 prompts the object 2 to autonomously move according to the first pattern (FIG. 3/STEP022).

Figure 12:
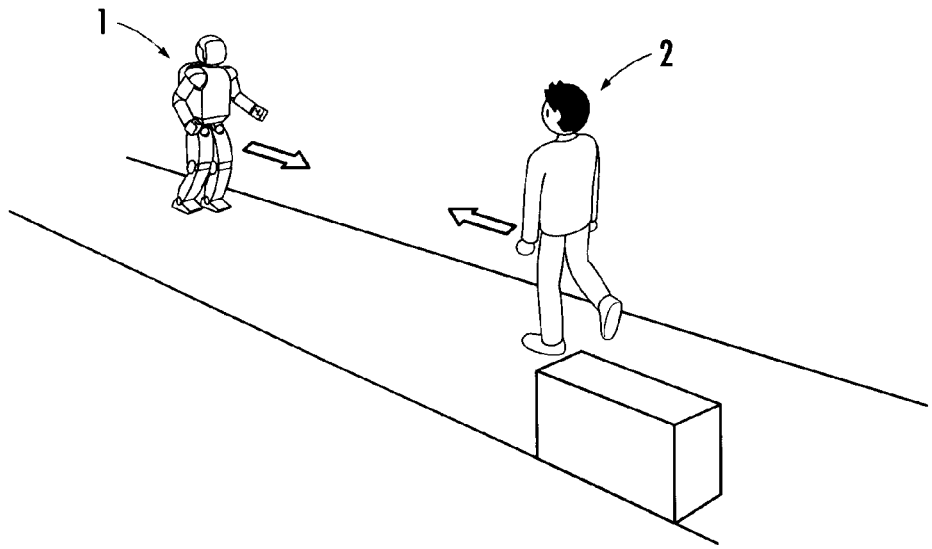
FIG. 12 is an explanatory view concerning a prompting operation by the robot for autonomous displacement of an object.
Figure 12:
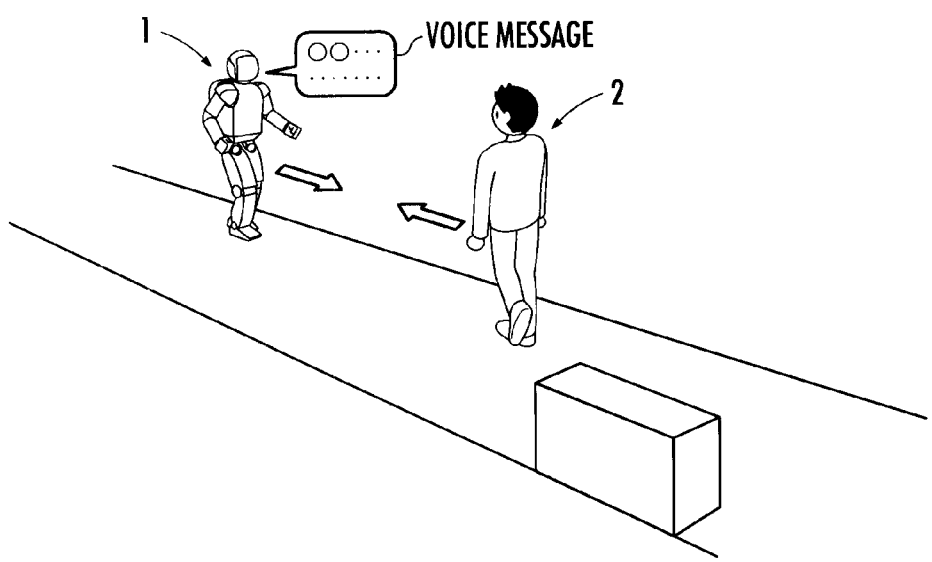
Figure 12:
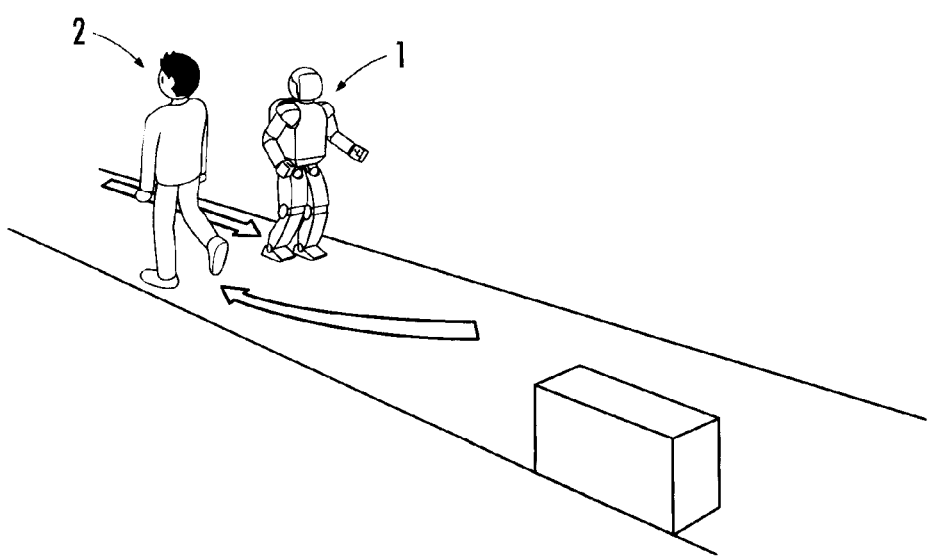

For example, as shown in FIG. 12(*a*), consideration is given to the case where it is determined that the second moving condition is satisfied, in a situation where the robot 1 and a human (the object belonging to the first classification) 2 are moving while facing each other.

In this case, as is shown in FIG. 12(*b*), a message so as to prompt the human 2 to displace according to the first pattern (such as altering the course to left side), or a message indicating the scheduled moving direction of the robot 1 (such as moving straight), is output as an audio from a loudspeaker mounted on the robot 1. Further, the operation of the robot 1 may be controlled to change the direction of the head 11 or the posture of the arms 12, so as to prompt the human 2 to alter the course, or to make the human 2 recognize the scheduled moving direction of the robot 1. Still further, an LED mounted on the robot 1 may be lighted.

By doing so, if the human 2 displaces autonomously as shown in FIG. 12(*c*), the robot 1 may continue moving according to the current target position trajectory $P_0$, that is, without altering the course.

When it is determined by the first control processing element 110 that the second moving condition is satisfied (FIG. 3/STEP012: YES), and at the same time determined that the object 2 belongs to the second classification (FIG. 3/STEP016: YES), the operation of the robot 1 is controlled by the second control processing element 120 so as to forcibly move the object 2 according to the first pattern (FIG. 3/STEP023).

Figure 13:
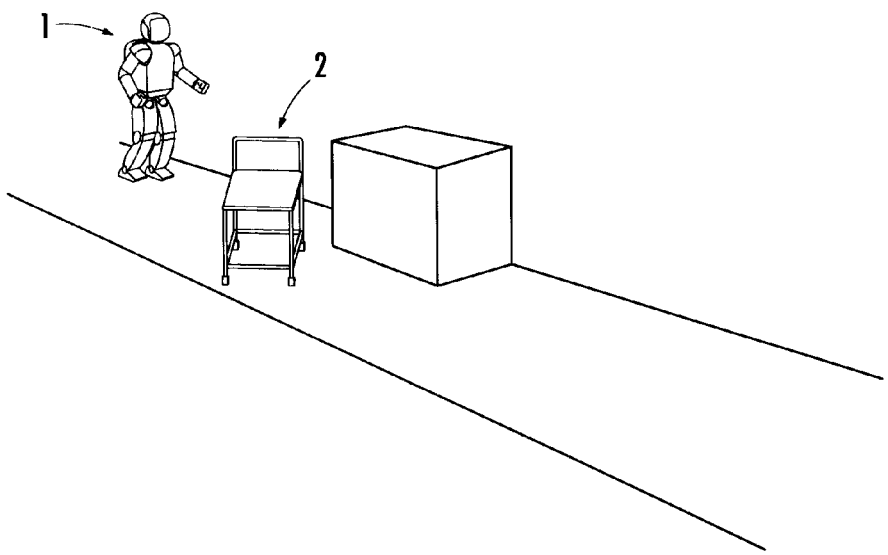
FIG. 13 is an explanatory view concerning a forcible displacement operation of the object by the robot.
Figure 13:
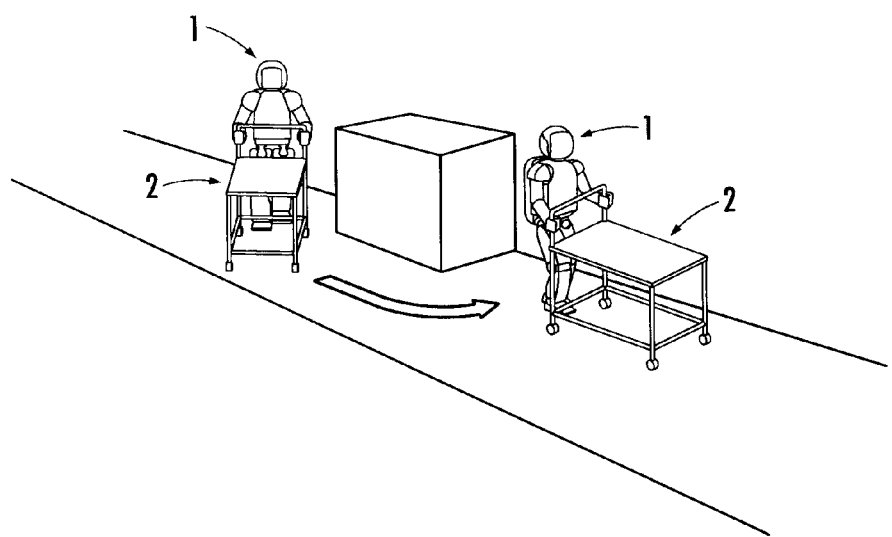
Figure 13:
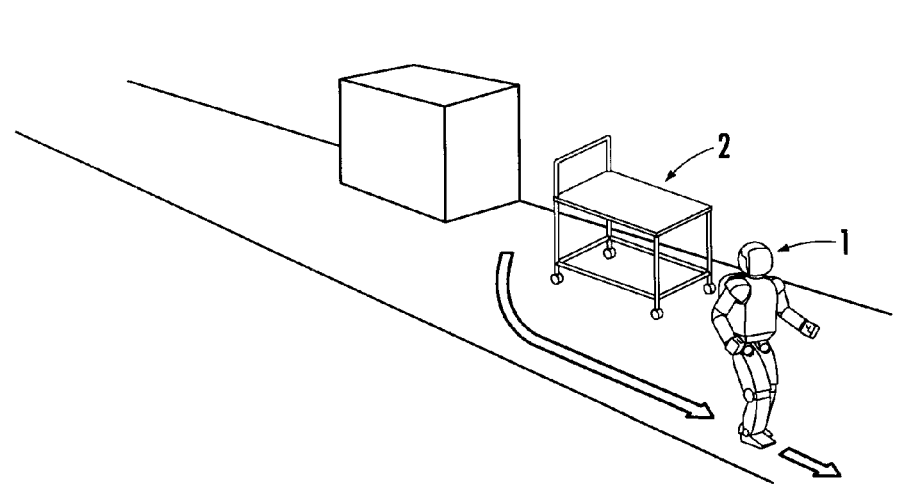

For example, as shown in FIG. 13(*a*), consideration is given to the case where it is determined that the second moving condition is satisfied, in a situation where a carriage (the object belonging to the second classification) 2 is placed at the front of the robot 1.

In this case, as shown in FIG. 13(*b*), the carriage 2 is moved according to the first pattern as indicated by the arrow in the figure, when the robot 1 moves while grasping a handle of the carriage 2 by both of the hands 14. Here, the robot 1 may move the carriage 2 while moving according to the current target position trajectory $P_0$, or may move the carriage 2 while moving temporarily apart from the current target position trajectory $P_0$. Still further, the robot 1 may move the carriage 2 by pushing away the carriage 2 with one of or both of the hands 14, while landing both of the legs 13 on the floor and without moving.

By doing so, as shown in FIG. 13(c), the robot 1 may continue moving along the target position trajectory $P_0$, by returning to the current target position trajectory $P_0$ according to need.

When it is determined that the second moving condition is not satisfied (FIG. 3/STEP012: NO), the first control processing element 110 further determines whether or not a "third moving condition" is satisfied on the basis of the result of state detection (FIG. 3/STEP013).

The "third moving condition" is a condition that the robot 1 is capable of moving according to a corrected target position trajectory $P_0$ without being obstructed by the object 2, when the object 2 is displaced according to a second pattern, and at the same time the target position trajectory $P_0$ is corrected. Specifically, the fact that the corrected target position trajectory $P_0$ does not cross or come into contact with the second spatial element $Q_2$, by displacing the second spatial element $Q_2$ from the current second position $P_2$ in the movable region QS, and at the same time by correcting the current target position trajectory $P_0$ of the first spatial element $Q_1$, is set as the third moving condition.

For example, as shown in FIG. 6(b), when the second spatial element $Q_2$ is displaced according to a broken-line arrow, and when the current target position trajectory $P_0$ of the first spatial element $Q_1$ indicated by a dot-dash line is corrected as indicated by a dashed-two dotted line, the corrected target position trajectory $P_0$ does not cross or come into contact with the displaced second spatial element $Q_2$ indicated by the broken line, so that it is determined that the third moving condition is satisfied.

Here, a predicted moving pattern of the object 2, which is set on the basis of either one of or both of a motional state of the object 2 (specified by a time changing pattern of the second position $P_2$, the second velocity vector $v_2$ and the Like) and a size of a spatial allowance in the vicinity of the object 2 (interval between another object or the boundary of the movable region), or in addition thereto a motional state of the robot 1 (specified by a time changing pattern of the first position $P_1$, the first velocity vector $v_1$ and the like), may be recognized as the "second pattern".

When it is determined that the third moving condition is satisfied (FIG. 3/STEP013: YES), the first control processing element 110 determines whether or not the object 2 belongs to the first classification (FIG. 3/STEP017). When it is determined that the object 2 does not belong to the first classification (FIG. 3/STEP017: NO), it is determined whether or not the object 2 belongs to the second classification (FIG. 3/STEP018). Here, the classification of the object 2 may be determined before determining the satisfaction of the third moving condition.

When it is determined by the first control processing element 110 that the third moving condition is satisfied (FIG. 3/STEP013: YES), and at the same time determined that the object 2 belongs to the first classification (FIG. 3/STEP017: YES), the second control processing element 120 controls the operation of the robot 1 so as to prompt the object 2 to move autonomously according to the second pattern by the robot 1, and at the same time corrects the target position trajectory $P_0$ (FIG. 3/STEP024 (refer to FIG. 12(b)).

When it is determined by the first control processing element 110 that the third moving condition is satisfied (FIG. 3/STEP013: YES), and at the same time determined that the object 2 belongs to the second classification (FIG. 3/STEP018: YES), the second control processing element 120 controls the operation of the robot 1 so as to forcibly move the object 2 according to the second pattern by the robot 1, and at the same time corrects the target position trajectory $P_0$ (FIG. 3/STEP025 (refer to FIG. 13(b)).

When it is determined that the object 2 does not belong to the first classification and the second classification (FIG. 3/STEP015 through STEP018: NO), or determined that the third moving condition is not satisfied (FIG. 3/STEP013: NO), the first control processing element 110 further determines whether or not a "fourth moving condition" is satisfied (FIG. 3/STEP014).

The "fourth moving condition" is a condition that the robot 1 is capable of moving according to the corrected target position trajectory $P_0$ without being obstructed by the object 2, when the target position trajectory $P_0$ is corrected. Specifically, the fact that the corrected target position trajectory $P_0$ does not cross or come into contact with the second spatial element $Q_2$ by correcting the target position trajectory $P_0$ of the first spatial element $Q_1$, is set as the fourth moving condition.

When it is determined by the first control processing element 110 that the fourth moving condition is satisfied (FIG. 3/STEP014: YES), the second control processing element 120 corrects the target position trajectory $P_0$ (FIG. 3/STEP026). Specifically, the target position trajectory $P_0$ is corrected according to the procedures explained below.

First, as shown in FIG. 9(a), taking the direction of movement of the second spatial element $Q_2$ as the front thereof, each of four circular shaped regions circumscribing the second spatial element $Q_2$ at front and back and right and left thereof are set as second circumferential cells $SQ_{21}$ through $SQ_{24}$, respectively.

Further, of the four second circumferential cells $SQ_{21}$ through $SQ_{24}$, the second circumferential cell $SQ_{22}$ having the smallest area of the overlapping region with the movable region QS (refer to shaded portion of FIG. 9(a)) is specified. The area is measured, for example, on the basis of the Monte Carlo method.

Figure 10:
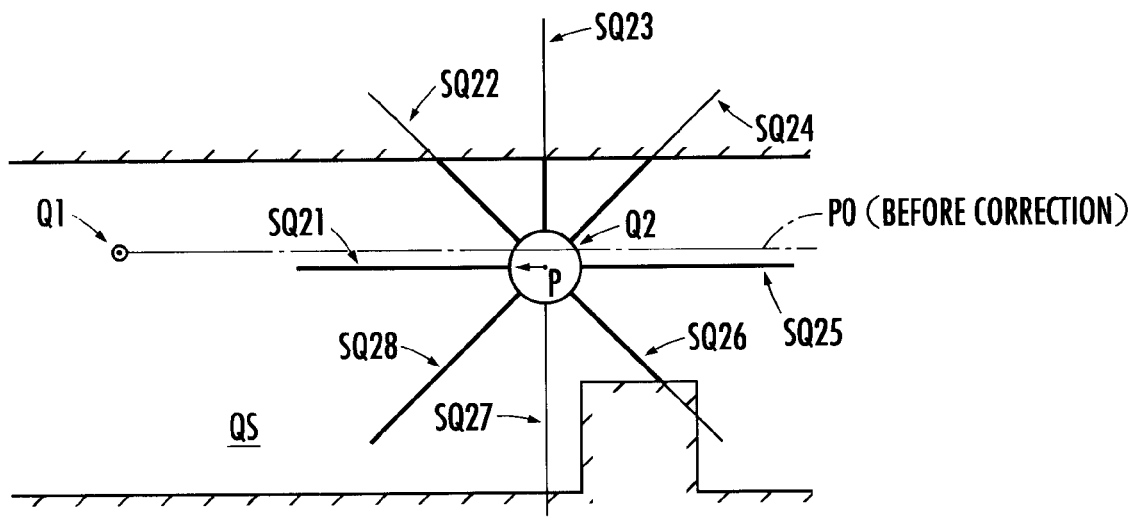
FIG. 10 is an explanatory view concerning the method of correcting the target position trajectory of the robot.
Figure 10:
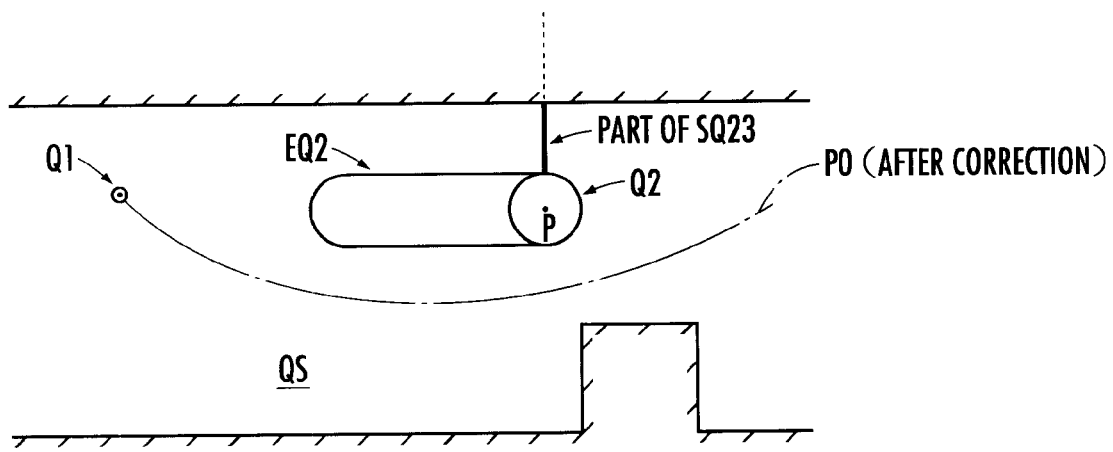

Further, as is shown in FIG. 10(a), taking the direction of movement of the second spatial element $Q_2$ as the front thereof, each of eight line segments extending in the front and back, right and left, and diagonally from the second spatial element $Q_2$ may be set as the second circumferential cells $SQ_{21}$ through $SQ_{28}$, respectively. Further, of the eight second circumferential cells $SQ_{21}$ through $SQ_{28}$, the second circumferential cell $SQ_{23}$ having the shortest length of the portion continuing from the second spatial element $Q_2$ to the boundary of the movable region QS (refer to heavy line in FIG. 10(a)) may be designated.

Here, from the viewpoint that the robot 1 passes only on one side of the object 2, the second circumferential cells $SQ_{21}$ may be set on the side of the direction of movement of the object 2, that is, only the second circumferential cells $SQ_{22}$ and $SQ_{24}$ in FIG. 9(a), or only the second circumferential cells $SQ_{23}$ and $SQ_{27}$ in FIG. 10(a) may be set.

Further, the size of the second circumferential cell $SQ_{2i}$ (the diameter in the case of a circular shaped region, and length in the case of a line segment) is set appropriately from the viewpoint of avoiding contact of the robot 1 and the object 2. Still further, the size of the second circumferential cell $SQ_{2i}$ may be variably set according to the magnitude of the velocity of the object 2 or the like.

Further, the shape of the second circumferential cell $SQ_{2i}$ may take various shapes, such as a fan-like shape, rectangular shape, and trapezoidal shape, in addition to the circular shape and the line segment. Still further, either one of or both of the shape and size of each of the second circumferential cells $SQ_{2i}$ may differ from one another. Instead of the requirement that the size is the smallest among the second circumferential cell $SQ_{2i}$, the second circumferential cell $SQ_{2i}$ satisfying the requirement that the size is equal to or less than a threshold value may be designated. Thereafter, for example as is indicated by the dot-dash line in FIG. 9(b) or FIG. 10(b), the target position trajectory $P_0$ is corrected so as not to come into contact with each of the second expanded spatial element $EQ_2$ and the designated second circumferential cell $SQ_{22}$ or $SQ_{23}$.

On the other hand, when the first control processing element 110 determines that the fourth moving condition is not satisfied (FIG. 3/STEP014: NO), then the second control processing element 120 controls the operation of the legs 13 and the like of the robot 1 so that the robot 1 stops or temporarily stops (FIG. 3/STEP027). Here, the operation may be controlled so that the robot 1 stops its operation according to the procedures explained below.

First, a new target position trajectory $P_0'$ which moves the first spatial element $Q_1$ closer to the boundary of the movable region QS is searched for. At this time, taking the first spatial element $Q_1$ as a reference, the intervals at a plurality of directions between the boundary of the movable region QS are evaluated as third intervals, and the new target position trajectory $P_0'$ is preferentially set in the direction in which the third interval is short.

Figure 11:
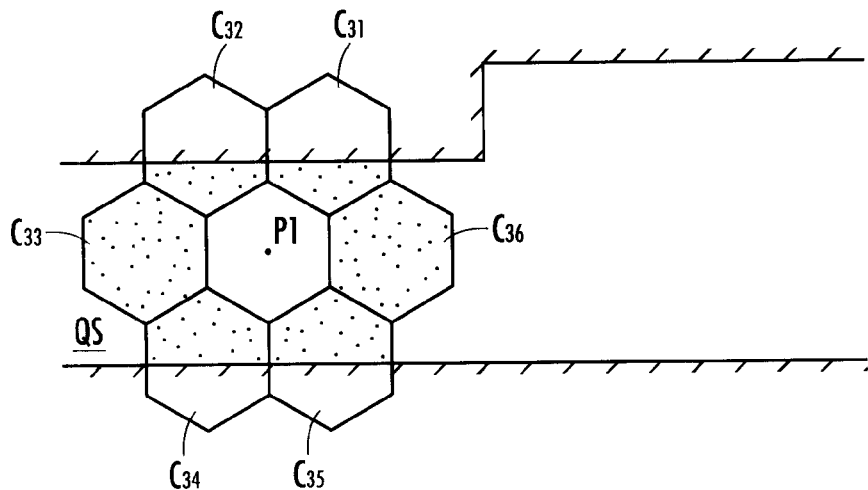
FIG. 11 is an explanatory view concerning a stopping operation of the robot.
Figure 11:
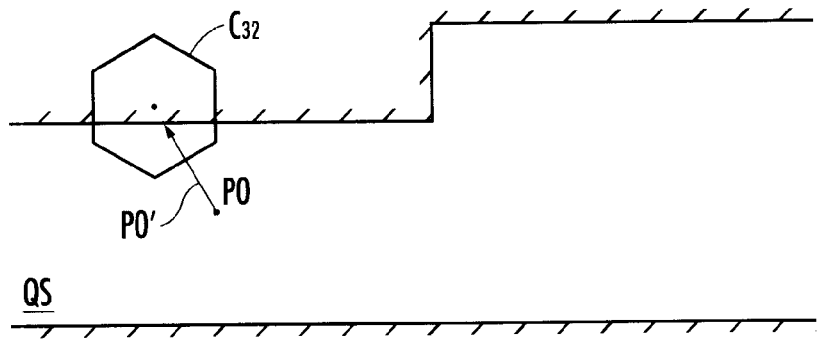
Figure 11:
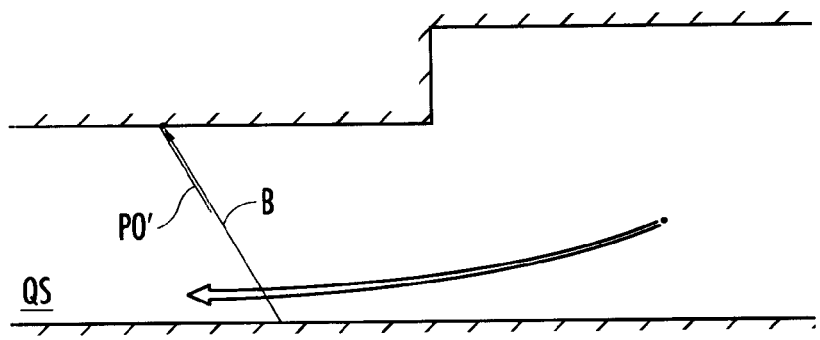

In evaluating the third interval, a plurality of third cells $C_{3i}$ (i=1 to 6) of a regular hexagonal shape and arranged at the circumference of the first spatial element $Q_1$ in the model space, as is shown in FIG. 11(a), are defined. Here, the shape of the third cells $C_{3i}$ shown in FIG. 11(a) may take various shapes such as a circular shape and a rod-shape, the number thereof may be an arbitrary number, and it may or may not overlap each other.

Thereafter, the overlapping area of the third cell $C_{3i}$ and the movable region QS is evaluated as the third interval, according to the Monte Carlo method or the like. In the situation shown in FIG. 11(a), each of the two cells $C_{31}$ and $C_{32}$ evaluated as having the smallest third interval.

Further, as shown in FIG. 11(b), the line segment extending from the first position $P_1$, toward the center of one of the third cell $C_{32}$ from the cells $C_{31}$ and $C_{32}$ that were evaluated as having the smallest overlapping area, and to the boundary of the movable region QS, is set as the new target position trajectory $P_0'$. The reason for selecting the third cell $C_{32}$ is that when the first spatial element $Q_1$ moves according to the target position trajectory $P_0'$, the velocity thereof holds a backward component when taking the prior direction of movement as forward.

Further, as a result, the target position trajectory $P_0'$ is retrieved so as to move away from the predicted position trajectory RP of the second spatial element $Q_2$ (refer to FIG. 11(b)). However, the new target position trajectory $P_0'$ may be retrieved so as to move away from the predicted position trajectory RP of the second spatial element $Q_2$, regardless of the length of the interval.

Then, the operation of the robot 1 is controlled so that after the robot 1 moves according to the new target position trajectory $P_0'$, the robot 1 stops moving at the terminal end thereof. At this time, the operation of the robot 1 is controlled so that the robot 1 moves while turning its back to the direction of movement (so as to walk backwards). Thereafter, the sequence of procedures mentioned above is repeated until the robot 1 reaches the target position.

According to the robot 1 exerting the above-mentioned function, when it is determined that the first moving condition is satisfied, the operation of the robot 1 is controlled so that the robot 1 moves according to the target position trajectory $P_0$ (FIG. 3/STEP011: Yes, STEP021).

The "first moving condition" is a condition that the robot 1 is capable of moving according to the current target position trajectory $P_0$ without being obstructed by the object 2.

Therefore, even though the object 2 exists in the surrounding of the robot 1, the robot 1 may move according to the current target position trajectory $P_0$ without being obstructed by the object 2.

Further, even when the first moving condition is not satisfied, when it is determined that the second moving condition is satisfied and at the same time the object is determined as belonging to the first classification, the operation of the robot 1 is controlled so as to prompt the object to move according to the first pattern or an arbitrary pattern (refer to FIG. 3/STEP011: NO, STEP012: YES, STEP015: YES, STEP022, FIG. 12).

The "second moving condition" is a condition that the robot 1 is capable of moving according to the current target position trajectory $P_0$ without being obstructed by the object 2, when the object 2 is displaced according to the first pattern.

The "first classification" means the classification of the object such as a human or other robot, which is capable of recognizing the action pattern of the robot 1, and at the same time capable of moving autonomously.

Therefore, after confirming in advance that the robot 1 is capable of moving according to the current target position trajectory $P_0$ without being obstructed by the object 2, when the object is displaced autonomously according to the prompting operation of the robot 1, the robot 1 makes operation so as to prompt the object 2 to move.

Thereafter, it is continuously determined whether or not the first moving condition is satisfied, and according to need, whether or not the second moving condition is satisfied (refer to FIG. 3/STEP011, STEP012). By doing so, the robot 1 is capable of moving or acting appropriately from the viewpoint of effectively avoiding the movement of the robot 1 from being obstructed by the object 2.

Further, even when the second moving condition is not satisfied, when it is determined that the third moving condition is satisfied and at the same time the object 2 is determined as belonging to the first classification, the operation of the robot 1 is controlled so as to prompt the object 2 to move according to the second pattern or an arbitrary pattern, and at the same time the target position trajectory is corrected (refer to FIG. 3/STEP012: NO, STEP013: YES, STEP017: YES, STEP024, FIG. 12).

The "third moving condition" is a condition that the robot 1 is capable of moving according to the corrected target position trajectory $P_0$ without being obstructed by the object 2, when the object 2 is displaced according to the second pattern and at the same time the target position trajectory $P_0$ is corrected.

Therefore, after confirming in advance that the robot 1 is capable of moving according to the corrected target position trajectory $P_0$ without being obstructed by the object 2, when the object 2 is displaced autonomously according to the prompting operation of the robot 1, and at the same time the target position trajectory $P_0$ is corrected, the robot 1 makes operation so as to prompt the object 2 to move.

Thereafter, it is continuously determined whether or not the first moving condition is satisfied, and according to need, whether or not the second moving condition is satisfied and further whether or not the third moving condition is satisfied (refer to FIG. 3/STEP011, STEP012, STEP013). By doing so, the robot 1 is capable of moving or acting appropriately from the viewpoint of effectively avoiding the movement of the robot 1 from being obstructed by the object 2.

Further, even when the first moving condition is not satisfied, when it is determined that the fourth moving condition is satisfied, the target position trajectory $P_0$ is corrected, and the operation of the robot 1 is controlled so as to move according to the corrected target position trajectory $P_0$ (refer to FIG. 3/STEP011: NO, STEP014: YES, STEP026, FIGS. 9 and 10).

The "fourth moving condition" is a condition that the robot 1 is capable of moving according to the corrected target position trajectory $P_0$ without being obstructed by the object, when the current target position trajectory $P_0$ is corrected.

Therefore, even though the object 2 exists in the surrounding of the robot 1, after confirming in advance that the robot 1 is capable of moving according to the corrected target position trajectory $P_0$ without being obstructed by the object 2, the target position trajectory $P_0$ is corrected. By doing so, the robot 1 is capable of moving or acting appropriately from the viewpoint of effectively avoiding the movement of the robot 1 from being obstructed by the object 2.

Further, even when the first moving condition is not satisfied, when it is determined that the second moving condition is satisfied, and at the same time the object 2 is determined as belonging to the second classification, the operation of the robot 1 is controlled so as to move the object 2 according to the first pattern (refer to FIG. 3/STEP011: NO, STEP012: YES, STEP016: YES, STEP023, FIG. 13)

The "second classification" means the classification of the object which is capable of being moved according to the acting of the force from the robot 1.

Therefore, after confirming in advance that the robot 1 is capable of moving according to the current target position trajectory $P_0$ without being obstructed by the object 2, when the object 2 is forcibly displaced according to the operation of the robot 1, the robot 1 is operated so as to move the object 2. By doing so, the robot 1 is capable of moving or acting appropriately from the viewpoint of effectively avoiding the movement of the robot 1 from being obstructed by the object 2.

Further, even when the second moving condition is not satisfied, when it is determined that the third moving condition is satisfied, and at the same time determined that the object 2 belongs to the second classification, the operation of the robot 1 is controlled so as to move the object 2 according to the second pattern or an arbitrary pattern, and the target position trajectory $P_0$ is corrected (refer to FIG. 3/STEP012: NO, STEP013: YES, STEP018: YES, STEP025, FIG. 13).

Therefore, after confirming in advance that the robot 1 is capable of moving according to the corrected target position trajectory $P_0$ without being obstructed by the object 2, when the object 2 is moved according to the operation of the robot 1 and the target position trajectory $P_0$ is corrected, the robot 1 is operated so as to move object 2. By doing so, the robot 1 is capable of moving or acting appropriately from the viewpoint of effectively avoiding the movement of the robot 1 from being obstructed by the object 2.

Here, in the embodiments mentioned above, the priority of determining satisfaction of the first through fourth moving conditions may be changed arbitrarily. For example, satisfaction of the fourth moving condition may be determined when it is determined that the first moving condition is not satisfied, and satisfaction of the second moving condition may be determined when it is determined that the fourth moving condition is not satisfied. Further, satisfaction of the fourth condition may be determined when it is determined that the second moving condition is not satisfied, and satisfaction of the third moving condition may be determined when it is determined that the fourth moving condition is not satisfied. Further, a part of the first through fourth moving conditions, for example determining satisfaction of the third moving condition or the fourth moving condition, may be omitted, and the operation control of the robot 1 according to the determination result thereof may be omitted.

In the embodiments mentioned above, the determination on whether or not the object belongs to the second classification is carried out after the determination on whether or not the object belongs to the first classification (refer to FIG. 3/STEP015 through STEP018). On contrary thereto, the determination on whether or not the object belongs to the first classification may be carried out after the determination on whether or not the object belongs to the second classification. Further, one of the determination on whether or not the object belongs to the first classification or the determination on whether or not the object belongs to the second classification may be omitted.

What is claimed is:

1. A mobile apparatus equipped with a control device, which moves autonomously by the control device controlling the operation thereof according to a target position trajectory indicating a temporal changing pattern of the target position, the control device comprising:

a first control processing element which is configured to determine whether or not a first moving condition in which the mobile apparatus is capable of moving according to the current target position trajectory without being obstructed by an object, is satisfied, and when it is determined that the first moving condition is not satisfied, determine whether or not a second moving condition in which the mobile apparatus is capable of moving according to the current target position trajectory without being obstructed by the object by a displacement of the object according to a first pattern, is satisfied, and at the same time determine whether or not the object belongs to a first classification in which the object is capable of recognizing the action pattern of the mobile apparatus and is capable of moving autonomously; and a second control processing element which is configured to control the operation of the mobile apparatus so as to move according to the target position trajectory, when it is determined by the first control processing element that the first moving condition is satisfied, and control the operation of the mobile apparatus so as to prompt the object to move according to the first pattern or an arbitrary pattern, when it is determined by the first control processing element that the second moving condition is satisfied and at the same time that the object belongs to the first classification.

2. The mobile apparatus according to claim 1, wherein the first control processing element is configured to determine whether or not the second moving condition is satisfied after recognizing a predicted moving pattern of the object set on the basis of either one of or both of a motional state of the object and a size of a spatial allowance at a surrounding of the object as the first pattern.

3. The mobile apparatus according to claim 1, wherein the first control processing element is configured to determine, when determining that the second moving condition is not satisfied, whether or not a third moving condition in which the mobile apparatus is capable of moving according to a corrected target position trajectory without being obstructed by the object, by the displacement of the object according to a second pattern and the correction of the target position trajectory, is satisfied, and the second control processing element is configured to control the operation of the mobile apparatus so as to prompt the object to move according to the second pattern or an arbitrary pattern as well as to correct the target position trajectory, when it is determined by the first control processing element that the third moving condition is satisfied, and at the same time the object is determined as belonging to the first classification.

4. The mobile apparatus according to claim 3, wherein the first control processing element is configured to determine whether or not the third moving condition is satisfied after recognizing a predicted moving pattern of the object set on the basis of either one of or both of a motional state of the object and a size of a spatial allowance at a surrounding of the object as the second pattern.

5. The mobile apparatus according to claim 1, wherein the first control processing element is configured to determine, when determining that the object does not belong to the first classification, whether or not the object belongs to a second classification in which the object is movable by acting of a force from the mobile apparatus, and the second control processing element is configured to control the operation of the mobile apparatus so as to move the object according to the first pattern, and so as to return to the current target position trajectory according to need, when it is determined by the first control processing element that the second moving condition is satisfied, and at the same time the object belongs to the second classification.

6. The mobile apparatus according to claim 5, wherein the first control processing element is configured to determine, when determining that the second moving condition is not satisfied, whether or not a third moving condition in which the mobile apparatus is capable of moving according to a corrected target position trajectory by the displacement of the object according to the second pattern and the correction of the target position trajectory, is satisfied, and the second control processing element is configured to control the operation of the mobile apparatus so as to move the object according to the second pattern, and so as to return to the current target position trajectory according to need, when it is determined by the first control processing element that the third moving condition is satisfied, and at the same time the object belongs to the second classification.

7. The mobile apparatus according to claim 1, wherein the first control processing element is configured to determine whether or not the mobile apparatus is capable of moving according to the target position trajectory without being obstructed by an object, according to whether or not an interval between the object and the boundary of the movable region sandwiching the target position trajectory is equal to or more than a safety interval.

8. The mobile apparatus according to claim 1, wherein the second control processing element is configured to control the operation of the mobile apparatus so as to move according to the current target position trajectory, when it is determined by the first control processing element that the first moving condition is satisfied, and to control the operation of the mobile apparatus so as to move according to the current target position trajectory and to prompt the object to move according to the first pattern, when it is determined by the first control processing element that the second moving condition is satisfied and at the same time that the object belongs to the first classification.

9. The mobile apparatus according to claim 3, wherein the second control processing element is configured to control the operation of the mobile apparatus so as to prompt the object to move according to the second pattern, to correct the target position trajectory, and to move according to the corrected target position trajectory, when it is determined by the first control processing element that the third moving condition is satisfied, and at the same time the object is determined as belonging to the first classification.

10. A mobile apparatus equipped with a control device, which moves autonomously by the control device controlling the operation thereof according to a target position trajectory indicating a temporal changing pattern of the target position, the control device comprising:

a first control processing element which is configured to determine whether or not a first moving condition in which the mobile apparatus is capable of moving according to the current target position trajectory without being obstructed by an object, is satisfied, and when it is determined that the first moving condition is not satisfied, determine whether or not a second moving condition in which the mobile apparatus is capable of moving according to the current target position trajectory without being obstructed by the object by a displacement of the object according to a first pattern, is satisfied, and at the same time determine whether or not the object belongs to a first classification in which the object is capable of recognizing the action pattern of the mobile apparatus and is capable of moving autonomously; and a second control processing element which is configured to control the operation of the mobile apparatus so as to move according to the target position trajectory, when it is determined by the first control processing element that the first moving condition is satisfied, and control the operation of the mobile apparatus so as to prompt the object to move according to the first pattern or an arbitrary pattern, when it is determined by the first control processing element that the second moving condition is satisfied and at the same time that the object belongs to the first classification, wherein the first control processing element is configured to determine, when determining that the first moving condition is not satisfied, whether or not a fourth moving condition in which the mobile apparatus is capable of moving according to a corrected target position trajectory without being obstructed by the object by the correction of the target position trajectory, is satisfied, and the second control processing element is configured to correct the target position trajectory, when it is determined by the first control processing element that the fourth moving condition is satisfied.

\* \* \* \* \*